United States Patent [19]

Sheppard, Sr.

[11] Patent Number: 4,625,509

[45] Date of Patent: Dec. 2, 1986

[54] COMBUSTION ENGINE

[76] Inventor: Darrel J. Sheppard, Sr., 28751 Delton, Madison Heights, Mich. 48071

[21] Appl. No.: 508,416

[22] Filed: Jun. 28, 1983

Related U.S. Application Data

[63] Continuation of Ser. No. 142,022, Apr. 21, 1980, abandoned.

[51] Int. Cl.$^4$ .......................... F02C 3/14; F26F 15/22
[52] U.S. Cl. .................. 60/39.35; 60/39.55; 60/265; 74/573 F
[58] Field of Search ............. 60/39.35, 39.55, 264, 60/265, 270; 74/572, 573 R, 573 F

[56] References Cited

U.S. PATENT DOCUMENTS

| | | | |
|---|---|---|---|
| 1,254,694 | 1/1918 | Humphries | 74/572 |
| 1,897,092 | 2/1933 | Weir | 60/39.35 |
| 2,444,742 | 7/1948 | Lutjen | 60/39.35 |
| 2,471,217 | 5/1949 | Johnson | 74/573 F |
| 2,551,111 | 5/1951 | Goddard | 60/39.35 |
| 2,594,629 | 4/1952 | Exner | 60/39.35 |
| 2,705,399 | 4/1955 | Allen | 60/265 |
| 2,770,097 | 11/1956 | Walker | 60/39.55 |
| 3,038,308 | 6/1962 | Fuller | 60/39.55 |
| 3,085,399 | 4/1963 | Kitchens | 60/39.35 |
| 3,238,719 | 3/1966 | Harslem | 60/39.55 |
| 3,321,911 | 5/1967 | Myles | 60/39.35 |
| 3,747,336 | 7/1973 | Dibelius | 60/39.55 |
| 4,041,699 | 8/1977 | Schelp | 60/39.55 |

FOREIGN PATENT DOCUMENTS

| | | | |
|---|---|---|---|
| 67459 | 6/1977 | Japan | 74/573 F |
| 63354 | 3/1941 | Norway | 60/39.35 |
| 2019943 | 11/1979 | United Kingdom | 60/39.35 |

Primary Examiner—Douglas Hart
Attorney, Agent, or Firm—Gifford, Groh, VanOphem, Sheridan, Sprinkle & Dolgorukov

[57] ABSTRACT

A combustion engine has a plurality of equidistantly spaced jets disposed about a drive shaft. Fuel flows through the center of a two-piece drive shaft and combines with air in jets for combustion which is self-sustaining once ignited. Each of the jets is designed to accommodate water injection for vaporization to increase the exhaust thrust of the jets. In a further embodiment of the invention, a liquid flywheel comprises a lower tank disposed about a rotating vertically aligned shaft and contains a liquid which rises up tubes connecting the tank to an upper chamber. Fluid accumulating in the upper chamber acts as a momentum stabilizer to increase the efficiency of the engine. Vaporization water may be introduced into each of the plurality of jets disposed about the drive shaft by connecting lines which receive water from a source connected to an annular chamber in the two-piece drive shaft. The entire assembly is housed in a suitable protective material and the bottom of the drive shaft may be splined so as to drive an axle or alternatively, a hydraulic pump. The vertical alignment of the rotating shaft assists in the stabilization of the vehicle during turns.

28 Claims, 8 Drawing Figures

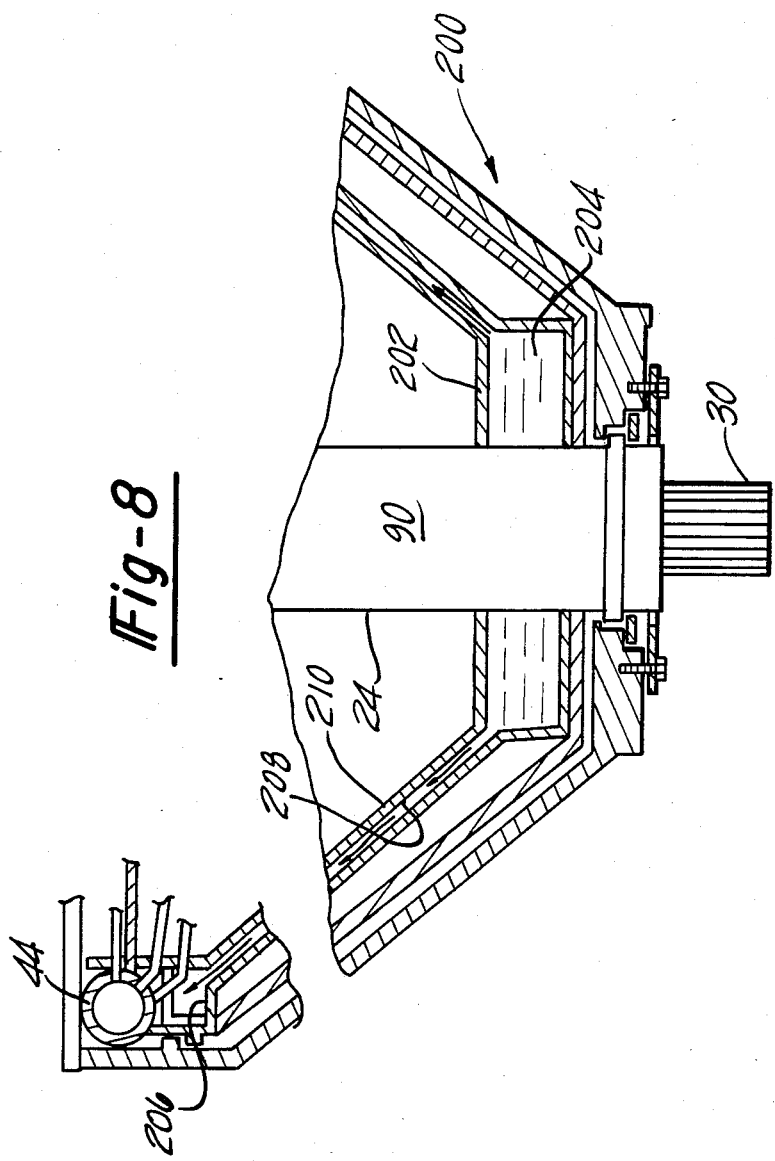

COMBUSTION ENGINE

This application is a continuation of application Ser. No. 142,022, filed Apr. 21, 1980, now abandoned.

BACKGROUND OF THE INVENTION

I. Field of the Invention

This invention relates to improvements in jet engines and other engines having a jet-like exhaust from a plurality of combustion chambers to rotate a shaft. The invention also relates to combustion chambers of an improved construction and momentum maintenance devices.

II. Description of the Prior Art

The conservation of fuel including gasoline, kerosene, and jet fuel has become of great importance. This is true in the automotive industry as well as other industries where fuels are used by internal combustion engines, turbines, jet engines, and the like.

Internal combustion engines are known for their inefficiency, especially gasoline engines. There has become a great need for, and a great deal of research has been directed toward, engines capable of using a variety of fuels including, most recently, alcohol or alcohol mixed with gasoline, termed "gasohol". However, due to limitations of the internal combustion engine, use of alternative fuels has not proven completely successful outside the realm of well-tuned, high-precision, racing engines and the like. This is primarily attributable to the cylinder and piston precision arrangement of the internal combustion engine, especially those used in automobiles. The highly accurate tolerances required in a piston engine prevent using more than one fuel without a general resetting of the engine, including the air/fuel mixture in the carburetor. The carburetors are generally of such precision setting that they must be varied according to the seasons and according to the grade of gasoline used for a given vehicle.

Due to the excessive weight of the internal combustion engine, there has been a move in the automobile industry and elsewhere to use other types of engines and to use piston engines having fewer than eight cylinders, especially six and four cylinder engines. Additionally, a great amount of research and development has been directed toward turbine engines, jet engines and the like. One of the primary considerations for a move away from the eight cylinder piston engine and toward other experimental engines is the overall weight of the engine and, for automobiles, the overall weight of the vehicle.

Gas turbines, jet engines, and experimental engines in the prior art have required a high number of precision formed parts which must necessarily be formed from expensive metals, ceramics, and synthetics. Additionally, there has been a great deal of trouble in providing a turbine or a jet engine for an automobile wherein the fuel is expeditiously directed to the combustors of the engine. These problems have complicated the structure and arrangement of turbine and jet engines for automobiles, thereby limiting access, for maintenance purposes, to the combustors, fuel lines, air intake passageways, and other adjustable components. Additional problems with gas driven engines and the like in automobiles include a large amount of wasted heat (as with piston engines) and noise in excess of environmental limits.

Internal combustion piston engines have conventionally used a fan blade type flywheel construction. This flywheel construction is often either exposed or covered by a housing. However, even with a housing, the flywheel has proven to be a dangerous element of an operating internal combustion engine. The flywheel is necessary to maintain the momentum of the engine but also applies a torque effect to the engine and necessarily the vehicle upon acceleration due to the gyroscopic effect of the rotating flywheel. It is, therefore, desirable to provide a flywheel construction which assists in the stabilization of a vehicle engine.

SUMMARY OF THE INVENTION

The present invention comprises a jet engine having a vertically aligned drive shaft and means for providing fuel to combustors operatively attached to the drive shaft.

The invention also provides a novel structure for combustors including a combustor structure which facilitates the use of water to increase the overall efficiency of the engine by providing thrust from steam and capturing energy from "waste" heat. Conventional continuous combustion engines including turbines experience operating temperatures in the range of 1000°-2200° F. The wet thrust of the present invention significantly lowers operating temperatures without a separate cooling system. In cold weather, a water/alcohol mixture or its equivalent is used rather than water alone. The invention also provides a novel means for maintaining the momentum of the engine in the form of a liquid flywheel. A liquid disposed in a lower tank rises to an upper chamber to maintain the momentum of the engine at high rates of revolution. The liquid stabilizes the rotating drive shaft and eliminates the requirement of ultra high precision parts required in turbines. The fan blades can be made from aluminum, ceramic, metal or equivalent materials.

The drive shaft for the engine is vertically aligned to increase the stabilization of the engine, especially during turning. The output end of the drive shaft is located at the bottom thereof and may be operatively connected to a conventional drive apparatus for an automobile or similar machine or may alternatively be connected to such mechanisms as a hydraulic pump, a pneumatic pump, and the like.

The drive shaft is preferably comprised of two inter fitting pieces which together form the fuel line inlets and, where necessary, water inlets for vaporization at the combustors to increase the overall efficiency of the engine and capture some of the heat from combustion of the fuel. The combustors may be operated with fuels which are self-sustaining once initially ignited.

The air intake structure is designed so that fresh air is drawn near the bearings at the top of the drive shaft and into a trough where it is directed by air lines to the combustors. Air intake near the bearings assists cooling the bearings, extending their operational lifetime. The air intake structure preferably comprises a fan blade disposed in arcuate openings in the area of the housing surrounding the top of the shaft. The shaft and a cap atop the shaft are fitted with bearings to house the rotating shaft, engine structure, fuel lines, and, optionally, the liquid flywheel assembly.

The combustors are disposed above troughs where exhaust gas accumulates and is vented through side portals adjacent thereto whereafter it is directed to the exhaust system externally of the engine. In a vehicle, this exhaust system would necessarily lead the exhaust to the rear of the vehicle.

An ignition system is provided for startup. It is, therefore, an object of the present invention to provide an engine having high fuel efficiency, which engine may be used for various applications, including automobiles.

It is also an object of the present invention to provide an engine which is suitable for burning a variety of fuels with only minor adjustments to the structure and settings of the engine.

It is also an object of the present invention to provide an engine which is capable of harnessing the excess heat of combustion so as to provide additional power to the machine utilizing the engine.

It is also an object of the present invention to provide an engine for use in automobiles and other applications wherein such engine is of an economical construction.

It is also an object of the present invention to provide an engine for use in automobiles and other applications wherein the engine comprises a minimum number of moving parts, has conveniently available materials of construction, and has few precision tolerance requirements.

It is also an object of the present invention to provide an engine for automotive and other applications wherein the fuel and air lines are easily interconnected with the combustors without complicating the overall structure of the engine, thereby providing accessibility to these lines for repair or adjustment.

It is also an object of the present invention to provide a vertically aligned engine that is easily connected to a drive shaft.

It is also an object of the present invention to provide a sealed exhaust construction for efficient ventilation of exhaust gases.

It is also an object of the present invention to provide a novel combustor design effective for burning fuels and/or fuel in addition to water to increase the thrust of the combustors.

It is also an object of the present invention to provide an engine having ignition for combustor means whereby the ignition may be operatively disconnected once self-sustaining combustion is in effect.

It is a further object of the present invention to provide a more effective flywheel construction utilizing a liquid for maintaining momentum of the engine.

It is also an object of the present invention to provide an improved drive shaft design including a two-piece drive shaft wherein the fuel and water supply lines are partially disposed in the shaft.

It is also an object of the present invention to provide a vertically aligned engine for stabilization of a vehicle powered by the engine.

These and other objects of the present invention will become apparent to one skilled in the art by reading the following discussion in conjunction with the attached drawing figures.

BRIEF DESCRIPTION OF THE DRAWINGS

A better understanding of the invention can be had upon a reading of the following discussion in view of the attached drawings in which:

FIG. 8 shows a partial section through the engine of the present invention and further including a liquid flywheel assembly with upper and lower reservoirs for a moving fluid.

DESCRITION OF THE PREFERRED EMBODIMENT

Figure 2:
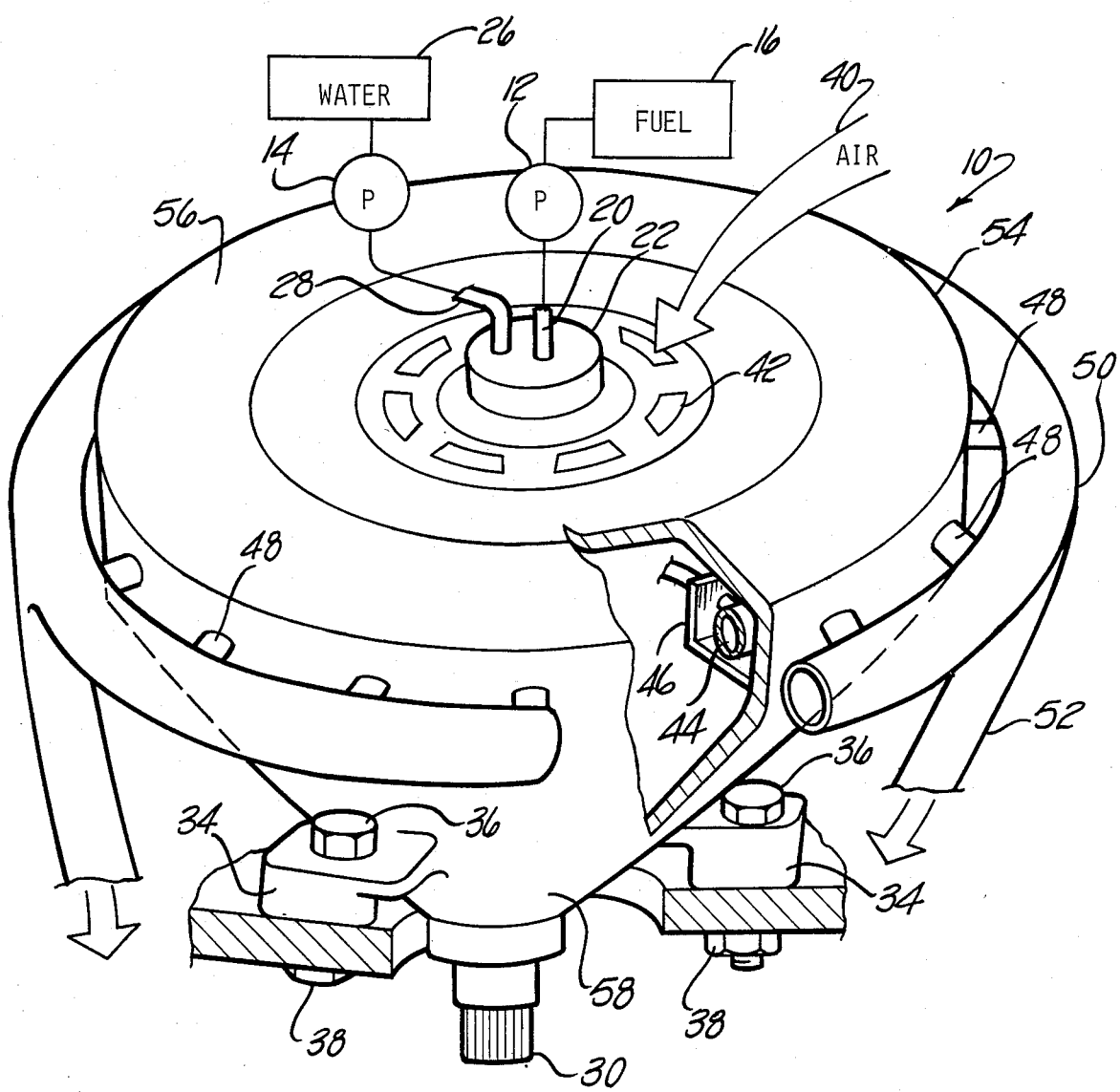
FIG. 2 is a perspective view of the engine of the present invention showing the external housing thereof partly broken away to expose the exhaust trough of the engine and showing a mounting for the engine.
Figure 1:
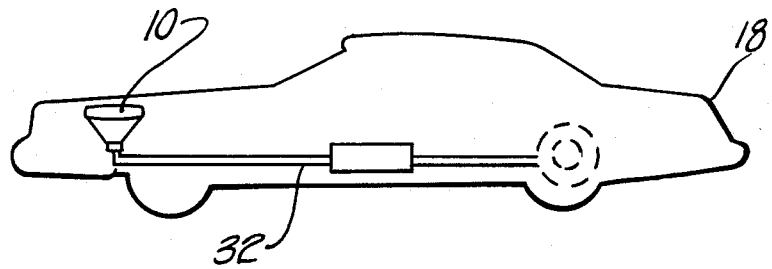
FIG. 1 is a diagrammatic view of an automobile utilizing a vertically aligned engine according to the invention wherein the rotating shaft of the engine is operatively connected to the drive system of the automobile to drive the rear wheels thereof.

With reference now to FIGS. 1 and 2, the engine 10 of the present invention is thereshown in a vertical alignent. Fuel and water pumps are diagrammatically represented at 12 and 14, respectively. Pump 12 is connected to a fuel tank 16 such as, for example, in a vehicle 18. The fuel is directed to a fuel inlet line 20 through the cap 22 above the drive shaft 24 (see FIGS. 3 and 4).

The water pump is connected between a water supply tank 26, whether in a vehicle or other storage location, and a water inlet line 28 which also passes into cap 22 above the drive shaft 24. In cold weather, a water/alcohol mixture or its equivalent may have to be used.

Drive shaft 24 has a splined output end 30 to drive a pump, conventional vehicle drive system represented schematically at 32 in FIG. 1, or other driven components.

The engine 10 of the present invention is of a relatively light weight due to its small number of parts and construction of lightweight materials. The engine is mounted to an automobile, for example, such as automobile 18 shown in FIG. 1, by engine mounts 34 using bolts 36 and nuts 38 or their equivalent.

Figure 3:
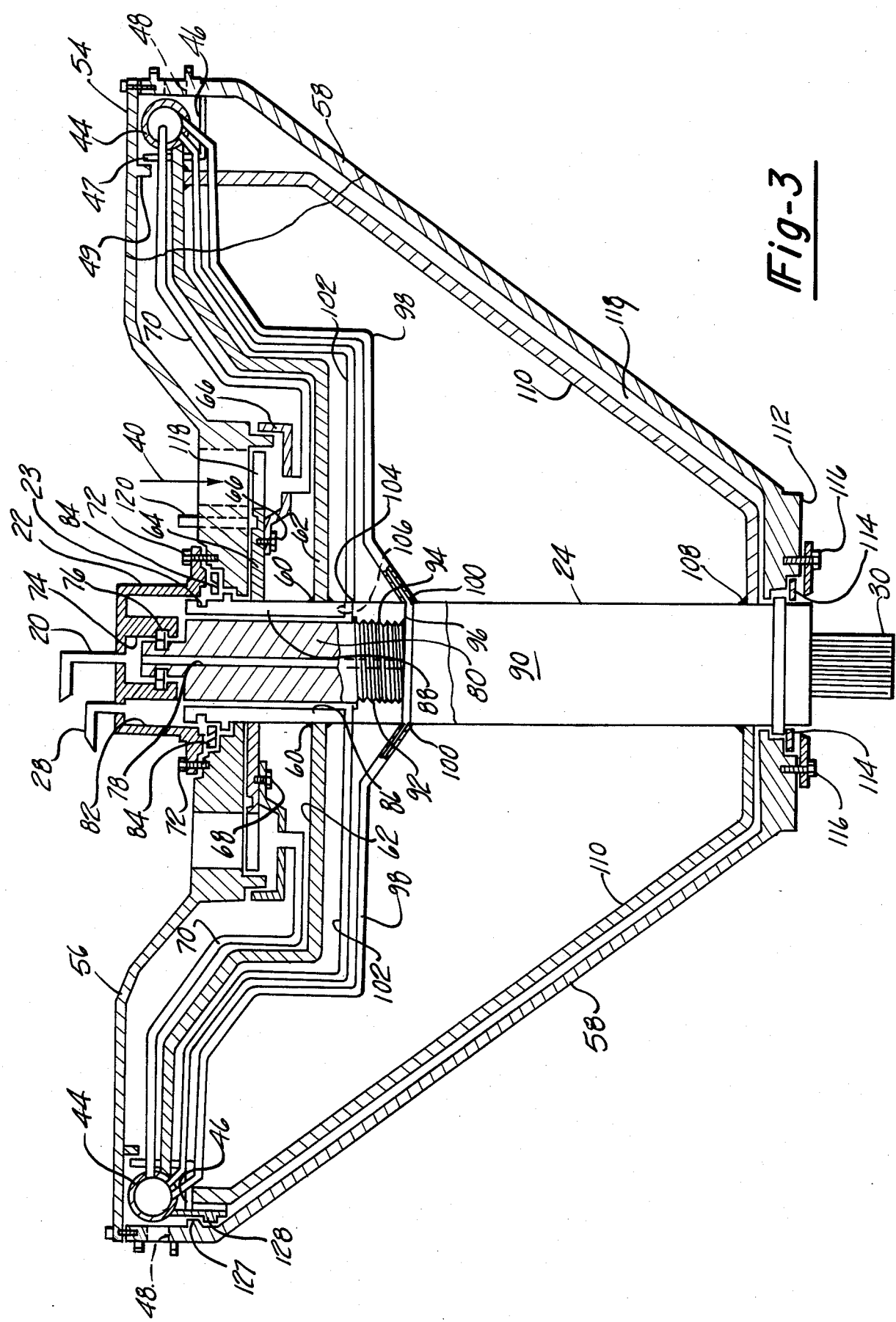
FIG. 3 is a side sectional view of the present invention showing two equidistantly, equiangularly disposed combustors disposed about a rotating drive shaft, all housed within an exterior shell, partially broken to show alternative constructions.
Figure 4:
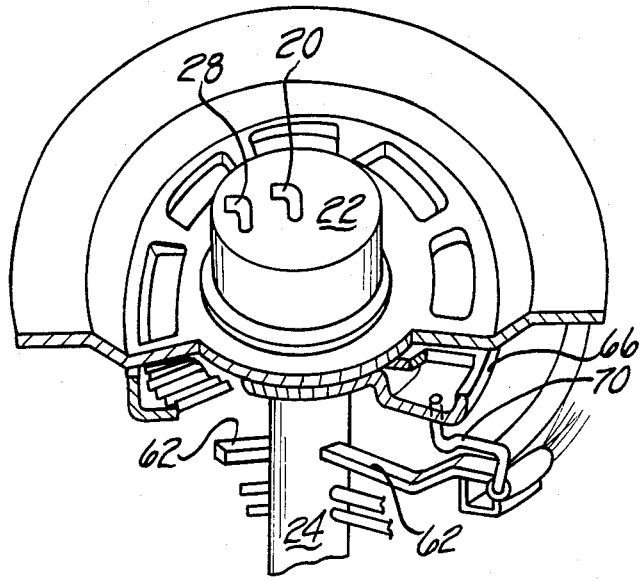
FIG. 4 is another perspective view of the engine showing the relative position of the water and fuel lead tube from the drive shaft and the structure of the air intake trough connected to a combustor.
Figure 6:
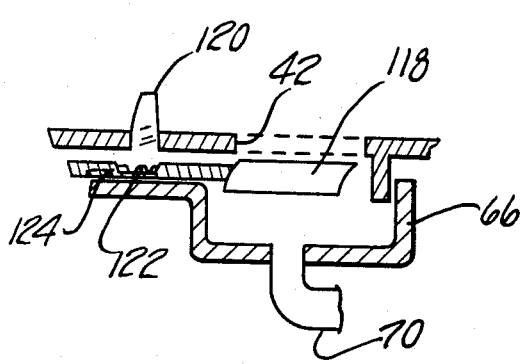
FIG. 6 shows a section through the air intake housing at the trough at the top portion of an engine of the present invention.

Air is taken into the engine as shown by the arrow 40 through the arcuate openings 42 and thereafter, as more fully shown in FIGS. 3, 4, and 6.

The exhaust from combustion in the engine is directed from combustors 44 (see FIGS. 4 and 5) into an exhaust chamber 46 which is defined by an L-shaped flange, in cross section, and thereafter directed through portals 48 to exhaust headers 50 whereupon they are directed to, for example, the conventional exhaust system of an automobile, represented diagrammatically at 52 in FIG. 2. The entire moving structure including drive shaft 24, combustors 44, and the interconnecting structure therebetween, are all housed within a stationary housing or shell 54 which includes a top portion 56 and sides 58.

Reference is now made to FIG. 3 for a more complete description of the construction of the engine of the present invention. Shown in FIG. 3 are two of three combustors 44 rigidly connected to the rotating drive shaft 24 at 60 such as by welds or other means. The three combustors 44 are disposed 120° apart around shaft 24. Combustor 44 on the right hand side of FIG. 3 is shown in a broken away section of the engine since the combustors are disposed 120° not 180° apart. An alternative design exhaust chamber 46 is formed in the right hand combustor of FIG. 3. The combustors are connected by appropriately shaped spokes 62 (see also FIG. 4). Also rigidly connected to the drive shaft is an air intake web 64 which supports the air intake pan 66. The pan 66 is connected to web 64 by machine screws 68 or their equivalent.

Air intake lines 70 are appropriately formed along the structure of spokes 62, leading from the pan 66 to combustors 44.

The cap 22 above shaft 24 is mounted to the stationary shell 54 by machine bolts 72 or their equivalent. Inlet fuel line 20 leads to a chamber 74 formed within the cap 22, and cap 22 is sealed at bearing 76 to provide a fuel flow through shaft fuel line 78 formed in a first portion 80 of the two-piece drive shaft 24. Inlet water line 28 leads to annular chamber 82 which is sealed at bearings 84 to ensure flow of vaporization water to annular water line 86 formed between the inner first portion and the upper tube-like portion 88 of bottom portion 90 of shaft 24. A seal is provided in groove 23 to prevent leakage.

Bottom portion 90, including its upper tube-like portion 88 is connected to upper portion 80 of shaft 24 by threads 92 of the upper portion 80 threadably received in a threaded bore 94 of lower portion 90.

As can be seen in FIG. 3, the central shaft fuel line 78 in the upper portion 80 of the shaft 24 leads to equiangularly positioned horizontal fuel lines 96 which connect to combustor fuel lines 98 at openings 100 in the lower portion 90 of shaft 24. Fuel lines 98 lead to the corresponding combustors 44 equidistantly spaced about drive shaft 24 (see also FIG. 5).

In a manner similar to the supply of fuel through line 98, vaporization thrust water is fed from the annular chamber 82 annular water line 86 to water lines 102 which lead to combustors 44. The water lines 102 are connected at equidistant apertures 104 to water line 86 by horizontal outlets 106 formed at equiangular positions about the tube-like upper portion 88 of second portion 90 of shaft 24.

An exhaust chamber 46 on arm 110 is further supported and connected to the drive shaft 24 by welds 108 or their equivalent at the lower portion of the drive shaft 24. The support arms 110 rotate with the structure of the drive shaft 24, all within housing 54. An alternative to exhaust chamber 46 is exhaust wall 47 sealing against lip 49, shown in the right-hand portion of FIG. 3.

Housing 54 also has a bottom portion 112 which is secured on bearings 114 by machine bolts 116 or their equivalent. Bearings 114 should be formed so as to prevent leakage of vapors from the inner space 119 as it may be possible for exhaust gases to leak into this area. It is, therefore, desirable, in order to assure proper exhaust pressure to a vehicle system, for example, that the exhaust does not leak at this area.

Referring now to FIG. 6, as well as FIG. 3, the turbine fan blades 118 are thereshown connected above pan 66 and positioned below arcuate air intake 42. Rotation of the drive shaft 24 provides input air pressure to lines 70.

Igniter 120 is positioned adjacent arcuate air intake slot 42 and is vertically movable so as to make contact with three conductive rings 122 positioned on an insulator 124 and connected to a lead wire (not shown). The position of the lead wire as it traverses to the combustors 44 is not critical to the invention but may, among other possibilities, be positioned along the air intake line 70 so as to lead to spark stem 126 shown in FIG. 5. Ignition contact 120 comes down in the manner of a phonograph needle to make contact with conductive rings 122. It should be noted that this ignition sequence is only required for startup procedure of the engine of the preferred embodiment of this invention since the combustors are designed for self-sustaining combustion once ignition has begun. Startup will ordinarily take about 60 seconds. Therefore, when the engine of the present invention reaches a predetermined rate of revolution, the ignition means 120 may be retracted from contact with conductive rings 122 by known conventional means, such as solenoid means.

Alternatively to the above ignition system, coil igniters may be used (not shown). A primary winding is positioned on the top portion of the stationary housing opposite a secondary winding on an insulator positioned on the web disposed about the shaft. The lower coil may be cast in plastic for ease of manufacture.

Referring again to FIG. 3, lip rings 127 and 128 are provided on the housing portion 58 and exhaust chamber 46 to inhibit leakage of exhaust in the inner space 119. Any of various known types of seals which do not interfere with the rotation of the engine are suitable for inhibiting exhaust gas leakage at the annular position.

Figure 7:
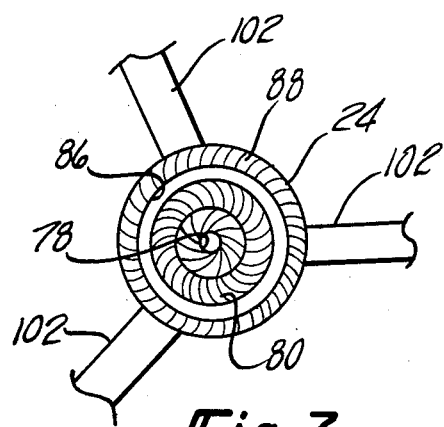
FIG. 7 shows a section through the two-piece drive shaft of the present invention.

FIG. 7 shows a top view of the shaft 24 cut through the upper tube-like portion 88 of bottom section 90; i.e., above the point of connection of water tubes 102 at apertures 104 and also above outlet holes 100 for the connection of fuel lines 98. Centrally located shaft fuel line 78 is thereshown as formed in the smaller upper first portion 80 of shaft 24. The annular water passage 86 is formed between upper tube-like portion 88 and the upper first portion 80 of shaft 24.

Figure 5:
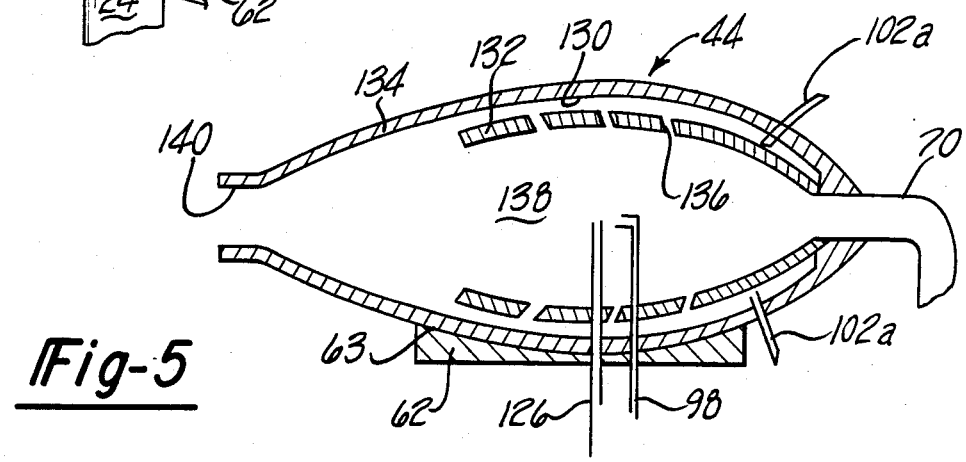
FIG. 5 is a section through a combustor according to the present invention.

Referring now to FIG. 5, a combustor 44 is thereshown having fuel inlet 98, spark stem 126, and air inlet line 70 formed as described above. The water inlet line 102 may be formed in an annular shape (not shown) or separated into equidistantly spaced tubules 102a about the front portion of combustor 44. These water inlet tubules 102a conduct vaporization water into chamber 130 preferably formed as an annular space inside the outer wall 134 of the front portion of the combustor. An inner combustor wall 132 extends adjacent the outer combustor wall 134 to form annular chamber 130. Inner combustor wall 132 has a series of apertures formed such as at 136. Combustion in inner chamber 138 creates a great amount of heat, which is often lost according to the structure of combustors known in the art prior to this invention. Therefore, it is Applicant's intention to capture this excess heat which is otherwise lost by radiation, conduction, or a cooling system. Exhaust gases at a superheated temperature penetrate apertures 136 and heat inner wall 132 to vaporize water in chamber 130, which water vaporizes to produce additional exhaust through exhaust port 140.

Combustors 44 are mounted on spokes 62 at 63 as shown in FIG. 5 or may be suitably mounted in any conventional manner to maintain the combustor 44 in a horizontal position, thereby enabling the exhaust thrust to exhaust port 140 to rotatably drive shaft 24.

The combustors 44 of the present invention are suitable for use with engines and vehicles such as aircraft where the thrust of such a combustor, is used for propulsion rather than to turn a drive shaft. In such a case, the air inlet line 70 is often omitted.

It can be seen, that depending upon the operating conditions of the engine and the particular fuel chosen for combustion, the vaporization water fed into chamber 130 may bleed into inner chamber 138 before vaporizing, but the rate of flow of water may be controlled by controlling water pump 14 according to the revolutions of the engine and other parameters including type of fuel burned.

Referring now to FIG. 8, the liquid flywheel assembly 200 is thereshown positioned in the construction of the engine 10 of the present invention. It should be noted that the engine 10 of the present invention may be operated with or without the improved liquid flywheel construction now shown in FIG. 8. Exhaust chamber 46 shown in the left-hand portion of FIG. 3 is adaptable for use in this embodiment. It can readily be appreciated that the maintenance of momentum at high revolutions of the engine is a key factor in fuel conservation and lifetime of the engine.

The liquid flywheel assembly according to the present invention has a lower reservoir 202 filled with a movable working fluid 204. The reservoir 202 is connected to lower portion 90 of drive shaft 24 by any suitable means to assure stability of the engine. An upper annular chamber 206 is formed below the path of the rotating combustors 44 and receives the working fluid 204 to maintain the fluid in the closed structure of reservoir 202, upper annular chamber 206, and the interconnecting flywheel passage 208 formed by flywheel arms 210.

As the engine begins to rotate with ignition, the working fluid 204 begins to work up passage 208 by virtue of the centrifugal force applied to the fluid. Once the engine reaches a predetermined speed, the working fluid 204 is primarily disposed in upper annular chamber 206 so as to maintain the momentum of the engine at high speed. As the revolutions of the engine decline, the working fluid begins to descend through passage 208 to reservoir 202. The working fluid 204 may comprise only water but is preferably a mixture of fluids which protect against freezing in the same manner as an antifreeze fluid for a conventional automobile engine radiator.

It will be appreciated that a water tank of sufficient size to handle vaporization water must be contained within a vehicle when the engine of the present invention is used with an automobile or other vehicle. The water provided for vaporization exhaust thrust must similarly be protected in winter weather by intermixing with a fluid which does not interfere with the combustion of the engine while preventing the formation of ice in the water supply lines and the water tanks. Similarly, if the engine is used for another application where the supply water is out of doors, this water must be protected against freezing in a cold environment. It can be seen that the liquid flywheel assembly 200 also forms the exhaust chamber 46 in this preferred embodiment of the invention. Of course, the working fluid must be properly sealed from the combustors 44.

Having described my invention, it will become apparent to those skilled in the art to vary the parameters of the invention including materials of construction, design of the air intake mechanism, design of the fuel flow passage from the fuel tank to the combustors of the engine, construction of the rotating drive shaft of the engine, types of fuel used with the engine, and liquids used in the liquid flywheel assembly 200, without departing from the scope or spirit of the invention.

Therefore, what I claim is:

1. A combustion engine comprising:
    a rotating drive shaft for power output at a first end of said shaft;
    combustor means for burning fuel and for vaporizing liquid water to generate exhaust gases, said combustor means being attached to said drive shaft so as to drive said shaft by rotating thereabout;
    first means for supplying fuel to said combustor means;
    second means for supplying air to said combustor means, wherein said combustor means comprises a plurality of jets receiving fuel from said first means and air from said second means, each of said plurality of jets having exhaust means for directing exhaust gases in a plane perpendicular to said drive shaft so as to rotate said shaft;
    ignition means for providing ignition in said combustor means; and
    third means for supplying liquid water into said plurality of jets, wherein said shaft has a water passage coaxial therewith to receive water and said third means for supplying water comprises first duct means communicating water from said water passage to said plurality of jets in sufficient quantity to produce thrust in said plurality of jets by the vaporization of the liquid water supplied to said jets and exhausted therefrom.

2. The invention as defined in claim 1 wherein said plurality of jets comprises three combustion chambers rigidly connected to said shaft and spaced equidistantly about said shaft opposite the first end of said shaft.

3. The invention as defined in claim 2 wherein each of said plurality of jets is connected to said shaft by a first rigid spoke connected near the first end of said shaft and by a second rigid spoke connected opposite said first end.

4. The invention as defined in claim 1 wherein said shaft has a fuel passage coaxial therewith to receive fuel and said first means for supplying fuel comprises second duct means communicating fuel from said fuel passage to said combustor means.

5. The invention as defined in claim 1 and further comprising a stationary housing mounted on bearings at each end of said shaft, said housing having apertures for air intake opposite said first end of said shaft, said housing also having exhaust ports, said second means for supplying air comprising third duct means communicating air from said apertures to said combustor means.

6. The invention as defined in claim 5 and further comprising fan blades connected to said shaft inside said housing below said apertures whereby rotation of said shaft draws air for combustion.

7. The invention as defined in claim 5 wherein said combustor means further comprises a flange having sealing means adjacent said housing for the prevention of exhaust leakage to said shaft and for directing exhaust gases to said exhaust ports.

8. The invention as defined in claim 1 and further comprising means for cooling said engine.

9. The invention as defined in claim 1 wherein each of said plurality of jets comprises:
    a hollow shell having an inner concentric wall connected opposite said exhaust means and extending part way along said shell thereby defining an outer spray chamber and an inner combustion chamber; and a water inlet nozzle positioned in said spray chamber and receiving water from said third supplying means to supply water into said spray chamber for vaporization to provide additional thrust from the exhaust of steam out said exhaust means.

10. The invention as defined in claim 9 wherein said wall has at least one opening communicating combustion heat from said combustion chamber to said spray chamber so as to facilitate vaporizing the water in said spray chamber.

11. The invention as defined in claim 9 and further comprising an air inlet opposite said exhaust means and connected to said second supplying means to provide air into said inner combustion chamber.

12. The invention as defined in claim 9 and further comprising an ignitor positioned in said combustion chamber and connected to said ignition means so as to provide ignition for starting the engine.

13. The invention as defined in claim 9 and further comprising a fuel nozzle positioned in said combustion chamber and connected to said first supplying means to supply fuel to said inner combustion chamber.

14. The invention as defined in claim 1 and further comprising a hydraulic pump operatively driven by said drive shaft.

15. The invention as defined in claim 1 and further comprising a vehicle powered by said engine.

16. The invention as defined in claim 1 and further comprising means for containing said combustor means so as to substantially isolate said first means, second means, and third means from exhaust gases.

17. A combustion engine comprising:
a rotating drive shaft for power output at a lower first end of said shaft;
combustor means for burning fuel and vaporizing water to generate exhaust gases, said combustor means being attached to said drive shaft so as to drive said shaft by rotating thereabout;
first means for supplying fuel to said combustor means;
second means for supplying air to said combustor means, wherein said combustor means comprises a plurality of jets receiving fuel from said first means and air from said second means, each of said plurality of jets having exhaust means for directing exhaust gases in a plane perpendicular to said drive shaft so as to rotate said shaft;
ignition means for providing ignition in said combustor means; and
third means for supplying water into said plurality of jets, wherein said shaft has a water passage coaxial therewith to receive water and said third means for supplying water compromises first duct means communicating water from said water passage to said plurality of jets in sufficient quantity to produce thrusts in said plurality of jets by the vaporization of the water supplied to said jets and exhausted therefrom;
wherein said shaft comprises;
a first portion including an output end and an opposite end having a hollow formed therein so as to define an upper cylindrical wall, said first portion having a transverse passage therethrough and at least one aperture through said upper cylindrical wall; and
a second portion insertable in the hollow of said first portion so as to define an annular passage about said second portion, said annular passage communicating with said at least one aperture for water supply, said second portion being threadably connected to said first portion and having an axial channel therethrough, said channel communicating with said transverse passage for fuel flow.

18. The invention as defined in claim 17 and further comprising a stationary cap having a water inlet communicating with said axial channel, said cap being sealed about said second portion on bearings.

19. A combustion engine comprising:
a rotating drive shaft for power output at a lower first end of said shaft;
combustor means for burning fuel and vaporizing water to generate exhaust gases, said combustor means being attached to said drive shaft so as to drive said shaft by rotating thereabout;
first means for supplying fuel to said combustor means;
second means for supplying air to said combustor means, wherein said combustor means comprises a plurality of jets receiving fuel from said first means and air from said second means, each of said plurality of jets having exhaust means for directing exhaust gases in a plane perpendicular to said drive shaft so as to rotate said shaft;
ignition means for providing ignition in said combustor means;
third means for supplying water into said plurality of jets, wherein said shaft has a water passage coaxial therewith to receive water and said third means for supplying water comprises first duct means communicating water from said water passage to said plurality of jets in sufficient quantity to produce thrust in said plurality of jets by the vaporization of the water supplied to said jets and exhausted therefrom; and
means for maintaining the momentum of said engine, wherein said shaft is vertically aligned and has a second end opposite said first end and said momentum maintaining means further comprises a flywheel assembly attached to said shaft, said assembly having a reservoir disposed about the lower first end of said shafts and an outer chamber radially spaced from the upper second end of said shaft and communicating with said reservoir, whereby a liquid contained in said assembly flows from said reservoir up to said radially spaced outer chamber by centrifugal force when said shaft rotates, thereby stabilizing said engine.

20. The invention as defined in claim 19 and further comprising a liquid contained in said assembly.

21. The invention oas defined in claim 20 wherein said liquid has a freezing point of about 0° C. or lower.

22. The invention as defined in claim 20 wherein said liquid is a water and alcohol mixture.

23. A combustion engine comprising:
a rotating drive shaft for power output at a first end of said shaft;
combustor means attached to said drive shaft for rotating said shaft;
first means for supplying fuel to said combustor means;
second means for supplying air to said combustor means;
third means for supplying liquid water to said combustor means; and
ignition means for providing ignition in said combustor means, wherein said combustor means comprises a plurality of jets receiving fuel from said first means, each of said plurality of jets having exhaust means for directing exhaust gases in a plane perpendicular to said shaft so as to rotatably drive said shaft, each of said plurality of jets having a hollow shell housing with an inner concentric wall connected opposite said exhaust means and extending part way along said shell thereby defining an outer spray chamber and an inner combustion chamber, each of said plurality of jets also having a nozzle positioned in said spray chamber and receiving liquid water from said third supplying means for vaporization to provide additional thrust.

24. A flywheel assembly for maintaining momentum and stabilizing an engine, said engine having a vertical rotating drive shaft with a lower end and an upper end, said assembly comprising:

a reservoir of liquid disposed about the lower end of said drive shaft;

an outer chamber above said reservoir and radially spaced therefrom about the upper end of said shaft; and an elongated passage canal connecting said reservoir and said outer chamber whereby, upon rotation of said shaft, a liquid contained in said reservoir flows through said passage canal to said chamber by centrifugal force thereby stabilizing said engine.

25. The invention as defined in claim 17 and further comprising means for containing said combustor means so as to substantially isolate said first means, second means and third means from exhaust gases.

26. A rotatable drive shaft for an engine receiving a fuel supply through said shaft and water from a water supply through said shaft, comprising:

a first portion including an output end and an opposite end and having a hollow formed therein so as to define an upper cylindrical wall, said first portion having a transverse passage therethrough and at least one aperture through said upper cylindrical wall; and a second portion insertable in the hollow of said first portion so as to define an annular passage about said second portion, said annular passage communicating with said at least one aperture for water supply, said second portion being threadably connected to said first portion and having an axial channel therethrough, said channel communicating with said transverse passage for fuel flow.

27. The invention as defined in claim 26 and further comprising a stationary cap having a water inlet communicating with said annular passage and a fuel inlet communicating with said axial channel, said cap being sealed about said second portion on bearings.

28. The invention as defined in claim 19 and further comprising means for containing said combustor means so as to substantially isolate said first means, second means and third means from exhaust gases.

* * * * *